United States Patent [19]
Hassler et al.

[11] Patent Number: 5,608,775
[45] Date of Patent: Mar. 4, 1997

[54] X-RAY DIAGNOSTIC INSTALLATION HAVING A SOLID-STATE IMAGE CONVERTER AND METHOD FOR OPERATING SAME

[75] Inventors: Dietrich Hassler, Uttenreuth; Martin Hoheisel, Erlangen, both of Germany

[73] Assignee: Siemens Aktiengesellschaft, Munich, Germany

[21] Appl. No.: 536,437

[22] Filed: Sep. 29, 1995

[30] Foreign Application Priority Data

Sep. 30, 1994 [DE] Germany .......... 44 35 105.4

[51] Int. Cl.$^6$ .......... H05G 1/44
[52] U.S. Cl. .......... 378/98.8; 378/97; 378/108
[58] Field of Search .......... 378/98.8, 98.2, 378/96, 97, 95, 106, 108

[56] References Cited

U.S. PATENT DOCUMENTS

| | | | |
|---|---|---|---|
| 4,803,714 | 2/1989 | Vlasbloem | 378/108 X |
| 4,982,095 | 1/1991 | Takahashi et al. | |
| 5,008,915 | 4/1991 | Vlasbloem | 378/108 |
| 5,194,736 | 3/1993 | Meulenbrugge et al. | |
| 5,379,333 | 1/1995 | Toth | 378/108 X |
| 5,400,378 | 3/1995 | Toth | 378/108 X |
| 5,450,462 | 9/1995 | Toth et al. | 378/108 X |

FOREIGN PATENT DOCUMENTS

| | | |
|---|---|---|
| 2135205 | 7/1980 | Germany . |
| 4125928 | 2/1993 | Germany . |

*Primary Examiner*—David P. Porta
*Attorney, Agent, or Firm*—Hill, Steadman & Simpson

[57] ABSTRACT

An x-ray diagnostic installation has a high-voltage generator, an x-ray tube supplied by the high-voltage generator, and a solid-state image converter on which x-rays, attenuated by an examination subject disposed between the x-ray tube and the solid-state image converter, are incident. A control unit is connected to the high-voltage generator and to the solid-state image converter, and controls the high-voltage generator to cause the x-ray tube to emit a first x-ray pulse of a short duration which produces an x-ray exposure in the solid-state image converter. The control unit conducts a read out of the solid-state image converter to obtain a measured value representative of the x-ray dose rate, the control unit using this measured value to calculate the x-ray transparency of the examination subject and, from the x-ray transparency, to calculate an optimum x-ray dose. The control unit then operates the high-voltage generator to cause the x-ray tube to emit a second x-ray pulse, having the optimum x-ray dose, for acquiring a diagnostic image of the examination subject.

15 Claims, 3 Drawing Sheets

X-RAY DIAGNOSTIC INSTALLATION HAVING A SOLID-STATE IMAGE CONVERTER AND METHOD FOR OPERATING SAME

BACKGROUND OF THE INVENTION

1. Field of the Invention

The present invention is directed to an x-ray diagnostic installation of the type having a high-voltage generator which supplied an x-ray tube which emits an x-ray beam, a solid-state image converter arranged in the x-ray beam and having light sensitive pixel elements arranged in a matrix, and a control unit connected to the image converter for controlling the high-voltage generator dependent on the x-ray dose.

2. Description of the Prior Art

German Patentschrift 21 35 205 discloses an x-ray diagnostic installation having an automatic exposure unit, by means of which a criterion representative of the accumulating x-ray dose is acquired during the x-ray irradiation. So that the ongoing radiation can be shut off after a predetermined value is reached.

In x-ray diagnostic installations such as disclosed in German Patentschrift 21 35 205, which employ an x-ray image intensifier as image converter, it is known to arrange an air-filled ionization chamber in front of the x-ray image intensifier as an auxiliary component. The slight current which arises between two electrode plates having a potential difference therebetween is directly proportional to the dose rate of the incident, ionizing radiation. The dose is determined by integration. Such an ionization chamber arranged in front of the x-ray image intensifier, however, undesirably attenuates the x-radiation.

When individual x-ray pictures or image series are made without prior fluoroscopy with exposure regulation, then a dose or exposure measurement must still ensue during the x-irradiation so that the x-ray source can be shut off when a predetermined value is reached.

A "real-time" measurement during an x-ray pulse is not possible given an x-ray solid-state image converter, for example an aSi:H x-ray image detector, because it operates in a storage mode. The image information is therefore only available some time after the end of the x-ray pulse, so that a dose measurement is only possible at that time.

X-ray examination systems are known which employ a sensor matrix which each matrix member being composed of a photosensor and a storage capacitor, whereby one of the terminals is connected to a switch and the other is connected to an additional cooperating electrode. European Application 0 486 102 discloses that the current in the cooperating electrode be measured in such a matrix after brief-duration closure of the switch, this current being representative of the momentary exposure and being utilizable for an exposure measurement. A read-out of the charge of the image stored in the sensor elements ensues after the exposure, however, so that it cannot serve for exposure measurement.

SUMMARY OF THE INVENTION

An object of the present invention is to provide an x-ray diagnostic installation of the type initially described, which uses a solid-state image converter, and which enables a simple and fast determination of the optimum x-ray dose during x-ray exposures such that no additional losses arise in the beam and without additional components.

This object is inventively achieved in an x-ray diagnostic installation of the type initially described and having a control unit which includes calculating circuit and wherein, for producing an x-ray exposure, a first, short x-ray pulse is generated and a first read-out of the solid-state image converter subsequently ensues for acquiring a measured value, the measured value being supplied to the calculating circuit which calculates the optimum x-ray dose on the basis of the acquired measured value; and wherein a second x-ray pulse is generated on the basis of the calculated value. The transparency of the person being examined is identified with low dose by the first x-ray pulse. An extrapolation to the necessary dose for the second x-ray pulse is then made on the basis of this measured value.

It has proven advantageous when the solid-state image converter is an aSi:H detector.

A fast acquisition of a measured value can ensue, in order to maintain only short time spans between the x-ray pulses, if the read-out after the first x-ray pulse is only implemented within the region of a dominant. The read-out event for acquiring a measured value can be made even faster if the x-ray diagnostic installation is provided with means for reading out only some of the lines of the x-ray video image are read out for the measured value acquisition after the first x-ray pulse.

The charges that have been read out can also contribute to the x-ray image when the measured values that have been read out are added in the calculating circuit.

It has proven advantageous when the video image is completely read out after the second x-ray pulse and when the lines that have already been read out are combined together with those of the second read-out, for example by additively superimposition.

In the inventive method for operating an x-ray diagnostic installation of the type described above for measuring the transparency of an examination subject, a first, short x-ray pulse is generated that is followed by a first read-out for measured value acquisition, the measured value is supplied to the calculating circuit for determining the transparency, and the calculating circuit calculates an optimum x-ray dose for a second x-ray pulse for producing an x-ray exposure on the based of the acquired measured values.

Inventively, the high-voltage generator can generate the second x-ray pulse for the second read-out with a higher voltage than for the first x-ray pulse.

DESCRIPTION OF THE PREFERRED EMBODIMENTS

Figure 1:
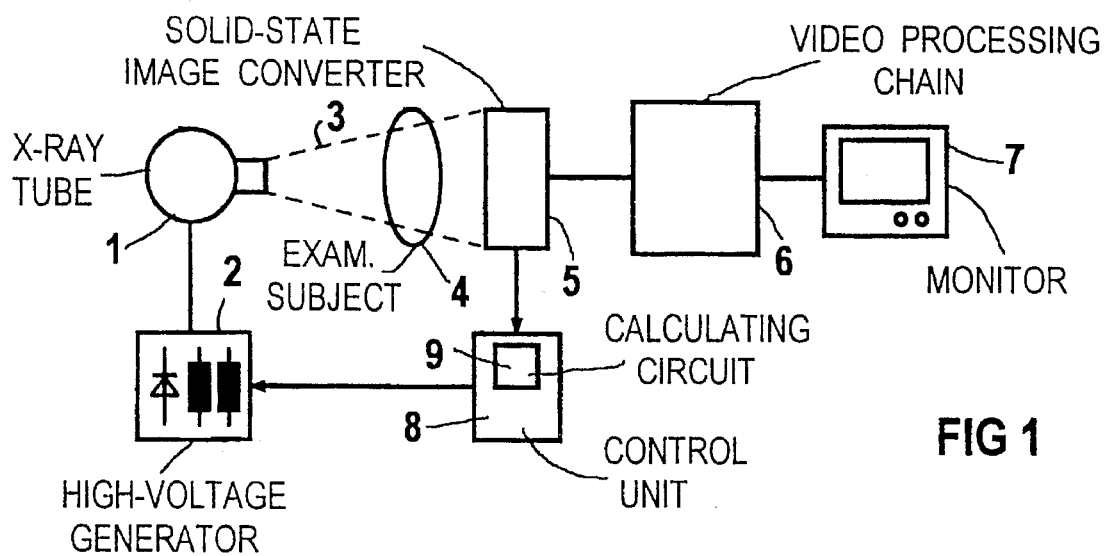
FIG. 1 is a block diagram of an inventive x-ray diagnostic installation.

FIG. 1 shows an inventive x-ray diagnostic installation having an x-ray tube 1 that is driven by a high-voltage generator 2. The x-ray tube emits an x-ray beam 3 that penetrates a patient 4 and is incident on an x-ray image converter 5 as an x-ray image attenuated according to the transparency of the patient 4. The x-ray image converter 5 can be composed of hydrogen-doped amorphous silicon (aSi:H).

The x-ray image converter 5 is connected to a playback means that can be composed of a video processing chain 6 and a monitor 7 connected thereto for the playback of the x-ray image. In a known way, the processing chain 6 can include a calculating circuit, filter circuits, image memories and converter, these not being shown.

A control unit 8 that is connected to the high-voltage generator 2 for controlling the x-ray tube 1 is connected to the x-ray image converter 5. The control unit 8 includes a calculating circuit 9 for determining the x-ray dose.

Figure 2:
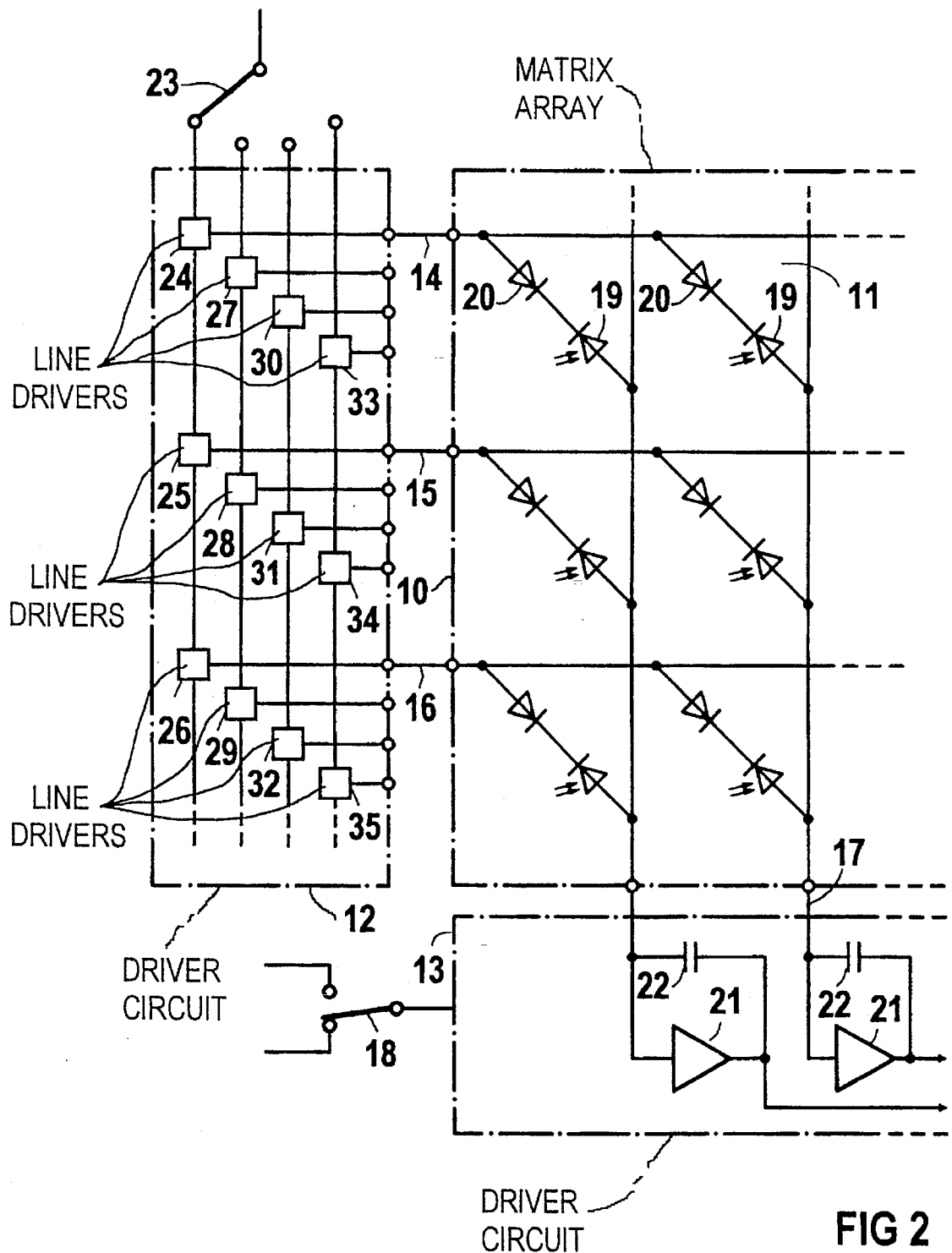
FIG. 2 is a schematic illustration of a part of an inventive solid-state image converter.

FIG. 2 shows a part of the x-ray image converter 5 as a solid-state image converter formed by a matrix array 10 composed of a number of individual picture elements or pixels with light-sensitive cells 11 that are arranged in x rows and y columns. These cells 11 are connected to a first driver circuit 12 for cell selection via row lines 14 through 16 and are connected to a second driver circuit 13 for read-out via column lines 17. A switch 18 for offset correction is connected to the second driver circuit 13.

The individual light-sensitive cells 11 are each composed of a photodiode 19 and a switching diode 20 whose cathodes are connected together. The respective anodes of the switching diodes 20 are connected to the row lines 14 through 16. The respective anodes of the photodiodes 19 are all connected to column lines 17.

The driver circuit 13 has an amplifier 21 for each column, these amplifiers 21 being connected to the respective column lines 17. The output of each amplifier 21 is fed back onto its input via a capacitor 22. Each amplifier 21 and its capacitor 22 form a voltage converter.

The first driver circuit 12 has a number of inputs to which a clock signal can be supplied in alternation by a selection switch 23. Line drivers 24 through 35 are connected to the corresponding row lines 14 through 16. Only the row lines 14 through 16 for the rows 1, 9 and 17, etc., that are connected to the line drivers 24 through 26, etc., are shown in FIG. 2. The other rows 2,10,18, etc. (not shown), are driven by the line drivers 27 through 29, etc. The same is true of the other rows of the matrix array 10 that are driven by the line drivers 30 through 35 and further line drivers that are not shown.

Figure 3:
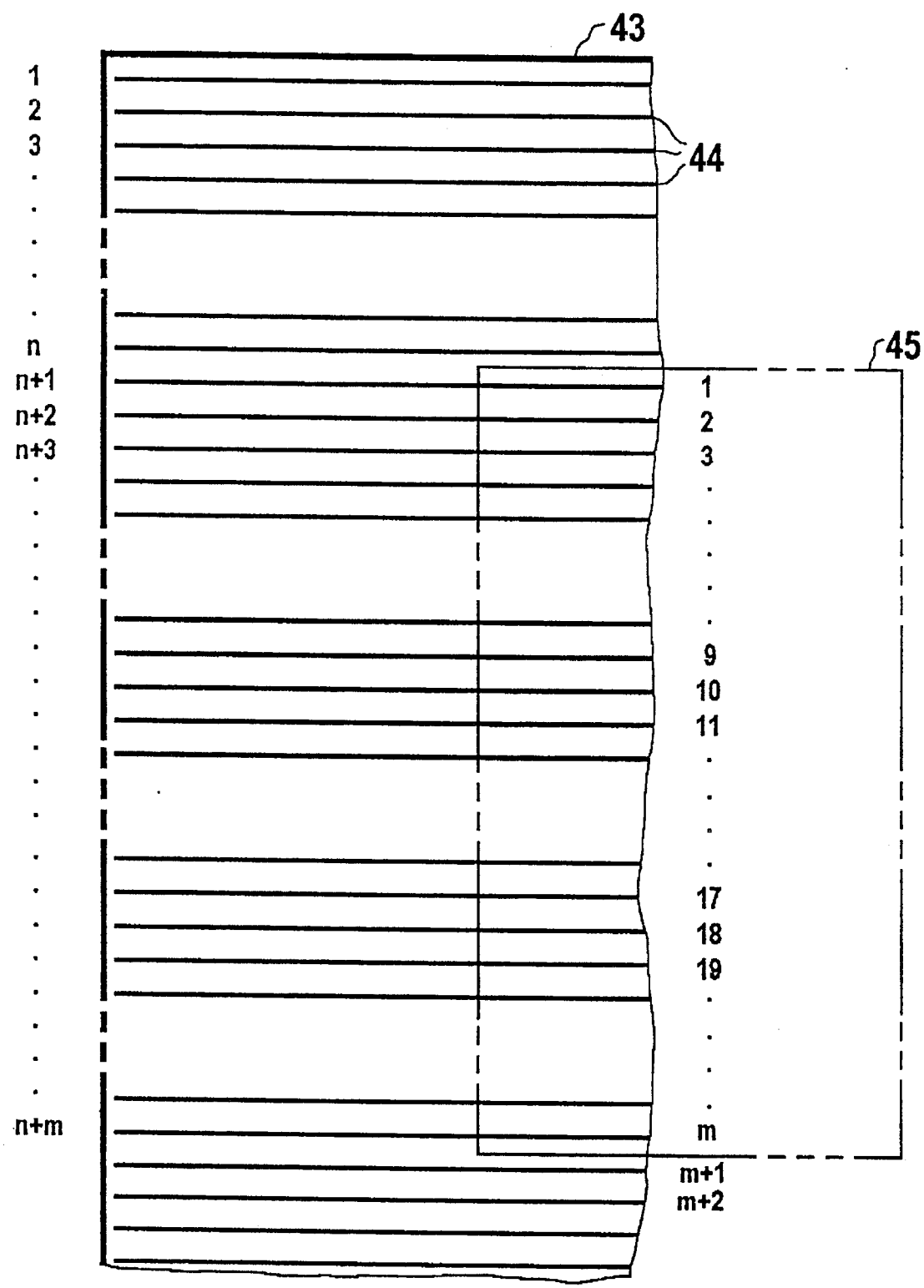
FIG. 3 shows the arrangement of the dominant within the video image produced in the installation of FIG. 1.

Before the functioning of the inventive x-ray diagnostic installation is described, the structure and the division of the video image 43 shall be set forth in greater detail with reference to FIG. 3. The video image 43 is composed of a number of lines 44, for example 1024 lines given a high-resolution monitor. A specific region 45 is defined as dominant referred to as the ROI (region of interest), in the x-ray video image 43. This ROI 45 can cover m lines 44 in the video image 43. The first line of the ROI 45 is thus the line n+1 at the same time and the last line m of the ROI 45 is the line n+m in the video image 43.

Figure 4:
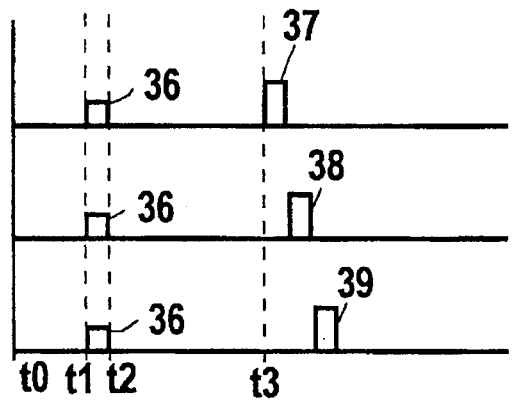
FIGS. 4 and 5 show operating signals for explaining the invention.

The functioning of the inventive x-ray diagnostic installation shall now be described in greater detail with reference to FIG. 4, the signals on the row lines 14 through 16 being shown therein. From time t0 to time t1, the matrix 10 is quenched with a light pulse. The pulse 36 serves the purpose of reverse-biasing the photodiodes 18. Subsequently, the charge due to the light emanating from the scintillator layer as a result of the x-ray pulse lasting from time t2 to t3 is reduced. All columns of the n+1$^{st}$ row are read out in parallel with the pulse 37. All pixels of the n+9$^{th}$ row are read out in parallel with the pulse 38 and all pixels of the n+17$^{th}$ row are read out in parallel with the pulse 39.

The row n+1 thereby forms the first line of the dominant 45. Instead of reading out row 2 as the next row (as is conventional), eight rows are skipped in this example and row 9 is read out. One then continues with row 17. A shorter time thus occurs until the video image has been sampled—due to the skipped lines—and an average brightness can be formed in the ROI 45. It is assumed that this read-out procedure suffices for the brightness/dose measurement and for calculating the transparency.

Only one line group with an image of low dose and reduced resolution can be obtained with this brief sampling. This, however, can be added to the main x-ray image. Since its area extent is very small, however, the lacking lines can also be calculated by simulation.

In this example, the skipping read-out reduces the signal-to-noise ratio of the average brightness in the dominant by a factor of eight. In a typical dominant region with ⅑ of the area, 14,500 pixels are still read out, so that the amplification of the signal-to-noise amounts to 120 on average. This shows the limits of this dose measurement.

Better resolutions can be achieved if a selectable reset were present for each line or row. This would allow the integration of the illumination of two x-ray pulses. In other words, the addition of most lines or rows of the two sub-images can be achieved on the panel itself. The lines are digitally added while they are being read out since the destructive nature of the read-out does not allow an addition on the panel.

Given only one reset acting on all lines or rows and pixels of the image, a different solution must be achieved wherein the features of a short x-ray pulse are added by means of the addition of two sub-images of two parts of an x-ray pulse. The principle of addition of the image lines on the panel is again used and then lines that have already been read out are only externally added.

Figure 5:
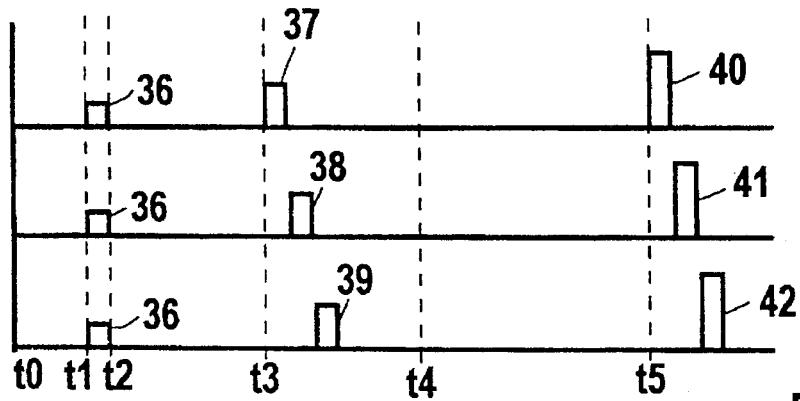

FIG. 5 shows the pulse sequence for the double (second) read-out of selected rows 1,9, 17, etc., with a second read-out pulse 40. After the read-out of this pair of rows, which are distributed over the dominant 45, the photodiodes 19 are charged to a voltage. This can be viewed as a new bias similar to the first pulse 36. From time t4 to t5, the second x-ray pulse is then generated without a reset pulse, so that a further integration of the skipped lines that were not yet read out is enabled and a new start position arises for the lines or rows that were already read out. This x-ray pulse is followed by the second read out pulse 40 with a third voltage that is higher than that of the pulse 37 and has the same forward voltage for the switching diode 20 as between pulses 36 and 37. The information sequences read out are externally added pixel-by-pixel in the calculating circuit in order to support the integration process on the panel for the lines or rows not yet read out.

The other, skipped rows can be read out after the second part of the x-ray pulse. Corresponding types of dark images can be employed for the offset compensation of the first and second read-out. All image lines of the entire video image are covered in the second read-out. The second read-out can ensue line-by-line or in an interlace mode.

Any remaining difference in the offset between the first and second read-outs can be compensated by switching the switch 18 which causes the voltage of the second driver circuit 13 to be modified. The charge due to the first read-out pulses 37 through 39 will be less complete than that due to the reset pulse 36, since the latter is longer.

In the inventive fast read-out, thus, row 1 of the ROI 45 (line n+1 of the video image 43) is read out first. Subsequently, seven lines are skipped, so that the first read-out is continued with row 9 of the ROI. Row 17 of the ROI 45 is read out next. This ensues until row m of the ROI is reached. The brightness information within the ROI 45 is already obtained with adequate precision after one-eighth of the time on the basis of this read-out procedure.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray diagnostic installation comprising:

a high-voltage generator;

an x-ray tube supplied by said high-voltage generator for emitting an x-ray beam;

a solid-state image converter disposed in said x-ray beam and having a plurality of light-sensitive elements arranged in a matrix, said solid-state image converter converting an x-ray image produced by said x-ray beam incident on said solid-state image converter into a corresponding optical image;

said x-ray tube and said solid-state image converter being adapted to receive an examination subject therebetween, said examination subject having an x-ray transparency; and control means connected to said high-voltage generator and to said solid-state image converter for operating said high-voltage generator for causing said x-ray tube to emit a first x-ray pulse for producing an x-ray exposure of said examination subject in said solid-state image converter, said control means including means for reading out said solid-state image converter during said x-ray exposure for obtaining a measured value representative of an x-ray dose rate, said control means including calculating means supplied with said measured value for determining the x-ray transparency of said examination subject and for calculating an optimum x-ray dose dependent on said x-ray transparency, and said control means operating said high-voltage generator for causing said x-ray tube to emit a second x-ray pulse with said optimum x-ray dose for obtaining said optical image of said examination subject, said first x-ray pulse having a duration which is short relative to a duration of said second pulse.

2. An x-ray diagnostic installation as claimed in claim 1 wherein said solid-state image converter comprises an aSi:H detector.

3. An x-ray diagnostic installation as claimed in claim 1 wherein said solid-state image converter has an x-ray-sensitive area and wherein said x-ray exposure comprises a dominant having a dominant area which is smaller than said x-ray-sensitive area, and wherein said means for reading out said solid-state image converter during said x-ray exposure comprises means for reading out said solid-state image converter only within said dominant area.

4. An x-ray diagnostic installation as claimed in claim 1 wherein said optical image has a plurality of image lines, and wherein said means for reading out said solid-state image converter during said x-ray exposure comprises means for reading out only a portion of said lines of said optical image.

5. An x-ray diagnostic installation as claimed in claim 4 wherein said control means further comprises means for reading out all lines of said optical image after said second x-ray pulse and means for combining said portion of said lines which were read out after said first x-ray pulse with said lines which were read out after said second x-ray pulse.

6. An x-ray diagnostic installation as claimed in claim 5 wherein said means for combining comprises means for additively superimposing said portion of said lines which were read out after said first x-ray pulse with said lines which were read out after said second x-ray pulse.

7. An x-ray diagnostic installation as claimed in claim 1 wherein said means for reading out said solid-state image converter comprises means for obtaining a series of measured values from said solid-state image converter, and wherein said calculating means comprises means for adding said measured values in said series of measured values for determining the x-ray transparency of said examination subject and for calculating said optimum x-ray dose.

8. An x-ray diagnostic installation as claimed in claim 1 wherein said control means comprises means for operating said high-voltage generator at a first x-ray tube voltage for generating said first x-ray pulse and for operating said high-voltage generator at a second x-ray tube voltage for generating said second x-ray pulse, said second x-ray tube voltage being higher than said first x-ray tube voltage.

9. A method for operating an x-ray diagnostic installation having a high-voltage generator, an x-ray tube which emits an x-ray beam directed at an examination subject, said subject having an x-ray transparency, and a solid-state image converter on which said x-ray beam, attenuated by said examination subject, is incident as an x-ray image, said solid-state image converter converting said x-ray image into a corresponding optical image, said method comprising the steps of:

operating said high-voltage generator for causing said x-ray tube to emit a first x-ray pulse which produces an x-ray exposure in said solid-state image converter;

reading out said solid-state image converter to obtain a measured value representative of an x-ray dose rate;

calculating said x-ray transparency of said examination subject dependent on said measured value and calculating an optimum x-ray dose for said examination subject dependent on said x-ray transparency; and operating said high-voltage generator for causing said x-ray tube to emit a second x-ray pulse having said optimum x-ray dose for producing said x-ray image of said examination subject, said first x-ray pulse having a duration which is short relative to a duration of said second x-ray pulse.

10. A method as claimed in claim 9 wherein said solid-state image converter has an x-ray-sensitive area and wherein said x-ray exposure comprises a dominant having a dominant area which is smaller than said x-ray-sensitive area, and wherein the step of reading out said solid-state image converter during said x-ray exposure comprises reading out said solid-state image converter only within said dominant area.

11. A method as claimed in claim 9 wherein said optical image has a plurality of image lines, and wherein the step of reading out said solid-state image converter during said x-ray exposure comprises reading out only a portion of said lines of said optical image.

12. A method as claimed in claim 11 comprising the additional steps of reading out all lines of said optical image after said second x-ray pulse, and combining said portion of said lines which were read out after said first x-ray pulse with said lines which were read out after said second x-ray pulse.

13. A method as claimed in claim 12 wherein the step of combining said portion of said lines which were read out after said first x-ray pulse with said lines which were read out after said second x-ray pulse comprises additively superimposing said portion of said lines which were read out after said first x-ray pulse with said lines which were read out after said second x-ray pulse.

14. A method as claimed in claim 9 wherein the step of reading out said solid-state image converter comprises obtaining a series of measured values from said solid-state image converter, and wherein the step of calculating said x-ray transparency comprises adding said measured values in said series of measured values for determining the x-ray transparency of said examination subject and for calculating said optimum x-ray dose.

15. A method as claimed in claim 9 wherein the step of operating said high-voltage generator for causing said x-ray tube to emit a first x-ray pulse comprises operating said high-voltage generator at a first x-ray tube voltage for generating said first x-ray pulse and wherein the step of operating said high-voltage generator for causing said x-ray tube to emit a second x-ray pulse comprises operating said high-voltage generator at a second x-ray tube voltage for generating said second x-ray pulse, said second x-ray tube voltage being higher than said first x-ray tube voltage.

* * * * *